United States Patent [19]

Sato et al.

[11] 4,412,643
[45] Nov. 1, 1983

[54] METHOD FOR BONDING OF A POROUS BODY AND A FUSION-MADE BODY

[75] Inventors: Tomio Sato; Kunio Okimoto; Toshio Yamakawa, all of Tosu, Japan

[73] Assignee: Director-General of the Agency of Industrial Science and Technology, Tokyo, Japan

[21] Appl. No.: 241,214

[22] Filed: Mar. 6, 1981

[30] Foreign Application Priority Data

May 26, 1980 [JP] Japan .................................. 55-69975

[51] Int. Cl.³ .............................................. B23K 1/04
[52] U.S. Cl. ...................................... 228/221; 419/8; 419/27; 228/234; 228/245
[58] Field of Search .............. 228/221, 234, 236, 237, 228/245; 75/208 R; 419/2, 8, 27

[56] References Cited

U.S. PATENT DOCUMENTS

| | | | |
|---|---|---|---|
| 3,332,774 | 7/1967 | Tuttle | 75/208 R X |
| 3,570,110 | 3/1971 | Zdanuk | 228/221 |
| 3,808,659 | 5/1974 | Alger, Jr. et al. | 75/208 R X |
| 4,195,764 | 4/1980 | Bogart | 75/208 R X |
| 4,289,833 | 9/1981 | Hachisuka | 75/208 R X |

Primary Examiner—Kenneth J. Ramsey
Attorney, Agent, or Firm—Brisebois & Kruger

[57] ABSTRACT

The invention provides a novel method for firmly bonding a porous body, e.g. a sintered body prepared by the powder metallurgical techniques with a metal powder, and a fusion-made body, e.g. an iron casting body, hitherto undertaken by the method of pressure welding or diffusion bonding. The inventive method utilizes the principle of infiltration and an infiltrater material is placed at the contacting portion between the porous body and the fusion-made body and heated at a temperature to exceed the melting point of the infiltrater material in vacuum so that the molten infiltrater material is infiltrated into the porous body leading to strong bonding upon solidification to have the porous body and the fusion-made body integrally bonded together.

5 Claims, 2 Drawing Figures

METHOD FOR BONDING OF A POROUS BODY AND A FUSION-MADE BODY

BACKGROUND OF THE INVENTION

The present invention relates to a method for firmly bonding a porous body and a fusion-made body utilizing the phenomenon of infiltration of a molten metal.

There are sometimes occasions in which firm bonding resistant to high temperatures is desired between a porous body such as a sintered metallic body prepared by the powder metallurgical process and a fusion-made body such as a body obtained by casting of a molten metal. Several methods are practiced for such a purpose of bonding including the pressure welding and diffusion bonding. The method of pressure welding is advantageous when the process is desired to be automatized but the method involves several drawbacks when eccentricity between the bodies to be bonded is great or the bodies to be bonded have very complicated configurations.

When the method of pressure welding is not applicable, the alternative method is the diffusion bonding owing to the absence of the limitation given by the configuration of the bodies to be bonded. The method of diffusion bonding is, however, sometimes defective because sufficient bonding strength is hardly obtained resulting in the breakage of the finished article at the interface between the bonded bodies in contrast to the very severe limitations in the working conditions such that, for example, the atmosphere must be evacuated to a high vacuum of, say, $10^{-4}$ Torr or better and the roughness of the surfaces under bonding must be well controlled.

SUMMARY OF THE INVENTION

It is therefore an object of the present invention to provide a novel and improved method for firmly bonding a porous body and a fusion-made body free from the above described disadvantages and drawbacks in the prior art methods. In particular, the object of the invention is to provide a novel method which can be very conveniently practiced even in the bonding of a porous and fusion-made bodies difficultly bonded by the prior art methods without limitation in the configuration of the bodies to be bonded.

The method of the present invention for bonding a porous body and a fusion-made body comprises bringing the porous body and the fusion-made body into contact with each other, placing an infiltrater material at the contacting portion between the porous body and the fusion-made body and heating the infiltrater material and the bodies under a contacting pressure against each other at a temperature exceeding the melting temperature of the infiltrater material in an atmosphere of vacuum or an inert gas so as that the molten infiltrater material is absorbed into the porous body followed by cooling to solidification.

DETAILED DESCRIPTION OF THE PREFERRED EMBODIMENTS

Figure 1:
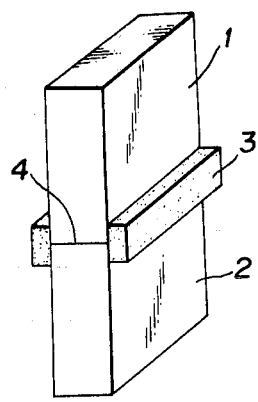
FIG. 1 is a perspective view illustrating a porous body and a fusion-made body in contact with each other and two pieces of an infiltrater material placed at the contacting portion of the porous and fusion-made bodies.

As is mentioned above, the inventive method comprises heating of a porous and a fusion-made bodies to be bonded together in contact with each other under a contacting pressure against each other in an atmosphere of vacuum with an infiltrater material placed at the contacting portion of the bodies. Despite the simple and mild conditions of the method, in which no activation of the atomic species of the metals involved can never take place, unexpectedly strong bonding is obtained by the method even with a fusion-made body having extremely low porosity and a porous body although the inventive method is also applicable to the bonding of two porous bodies instead of a porous body and a fusion-made body.

The porous body here implied is a body obtained by the powder metallurgical process of a metal powder with compression and sintering or a sintered ceramic body provided that the porosity of the body is relatively larger to permit infiltration of the molten infiltrater material or, in other words, the apparent density of the body is considerably smaller than the true density thereof. The fusion-made body here implied, on the other hand, includes any bodies prepared by the solidification of a molten metal or alloy o castings of a metal or alloy. The fusion-made bodies are characterized by the very low porosity or, in other words, by the apparent density substantially equal to the true density.

The infiltrater material is defined as a metal or alloy having a melting point lower than the porous body or the fusion-made body having sufficient wettability as molten on the surfaces of both the porous body and the fusion-made body. It is also of course that the infiltrater material should have sufficient mechanical strengths and stability under the conditions in which the bonded article is used. The infiltrater material is used either in a powdered form or, preferably and if possible, in a shaped form of a powder compact or a sintered body to be in better adaptation to the outer configuration of the bodies to be bonded to the contacting portion.

The inventive method is of course applicable to the bonding of bodies with relatively complicated configurations. In such a case, each of the porous body and the fusion-made body is first prepared in divided segments which can be shaped with no particular difficulties. The method for the preparation of segments of the porous body or fusion-made body may be conventional either by the powder metallurgical techniques with a metal powder or by the techniques of casting of a molten metal. It is advantageous that the design of the above mentioned segments be such that the final assemblage of the segments into a finished article can be completed by bonding the porous segment and the fusion-made segment. It is preferable that the surfaces of the segments at which bonding should be effected are ground flat in advance by use of a sandpaper or the like to give better contacting between the segments leading to stronger bonding. The segments or parts thus prepared are then assembled together to the configuration of the finished article contacting at the surfaces of the porous body and the fusion-made body and one or more of the pre-shaped powder compacts of the infiltrater material are placed at the contacting portion between the bodies.

FIG. 1 illustrates schematically the porous body 1 of a rectangular block brought into contact with the fusion-made body 2 of also a rectangular block with two pieces of powder compacts 3 of an infiltrater material applied and held in contact with the junction lines on both sides of the rectangular blocks around the contacting surfaces 4 thereof.

Figure 2:
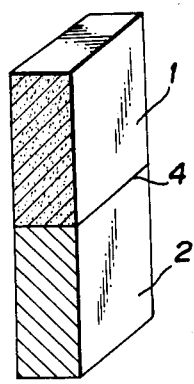
FIG. 2 is a perspective view illustrating a cross section of a finished article obtained by the method of the invention.

The assemblage of the blocks and the pieces of the infiltrater material is then placed in a vessel capable of being evacuated and the vessel is evacuated to a vacuum. The pressure of the atmosphere in the vessel is usually at about $10^{-1}$ Torr and a higher vacuum, i.e. a lower pressure, gives no particular additional advantages. Alternatively, the vessel may be filled with an inert gas such as argon. On the other hand, the porous body and the fusion-made body are pressed against each other so as that the pressure at the contacting surface is at least 5 kg/cm$^2$ or, preferably, at least 10 kg/cm$^2$ or higher with simultaneous temperature elevation. The temperature is increased to exceed the melting temperature of the infiltrater material but should not exceed the melting point of either the porous body or the fusion-made body having a lower melting temperature than the other. The above defined conditions of the contacting pressure between the porous and fusion-made bodies, atmosphere and temperature are maintained for about 10 to 60 minutes during which the infiltrater material is melted and infiltrated into the porous body. Cooling of the thus assembled bodies with the contacting pressure maintained as such gives a finished article of firmly bonded porous body and fusion-made body as illustrated in FIG. 2 to show the cross section. The fusion-made body 2 is bonded together with the porous body 1 at the contacting surface 4 while the infiltrater material is absorbed and distributed in the porous body 1 in the vicinity of the contacting surface 4 with the fusion-made body 2. When an appropriate amount of the infiltrater material has been used, substantially all of the molten infiltrater material is absorbed in the porous body so that the surface of the bonded article in the visinity of the conjunctive line is flat and smooth without mechanical finishing work. It is noteworthy that the mechanical strengths of the porous body are greatly increased by absorbing the infiltrater material. On the other hand, almost no molten infiltrater is absorbed by the fusion-made body excepting the case of alloying.

Following are the examples to illustrate the inventive method in further detail.

EXAMPLE 1.

Two rectangular blocks were prepared each having dimentions of 5 cm×10 cm×15 cm, one with a sintered body of an atomized iron powder having an apparent density of 6.1 g/cm$^3$ corresponding to a relative density of 78% and the other with a fusion-made body of a carbon steel S10C specified in JIS G 4051. These two blocks were brought into contact with each other at the 5 cm×10 cm surfaces ground flat in advance by use of a sandpaper.

Separately, two pieces of powder compact each weighing about 400 g and having dimensions of 1.5 cm×3 cm×10 cm were prepared with an electrolytic copper powder admixed with 5% of iron powder and these pieces were applied each on to one of the lateral surfaces of the blocks contacted with each other along the junction lines around the contacting surface at the 3 cm×10 cm surface of each of the pieces into an assemblage as shown in FIG. 1.

The assemblage was then placed in a vacuum vessel with a pressure at the contacting surfaces of the blocks of about 10 kg/cm$^2$ with heating as such to a temperature of 1140° C. and kept at the temperature for 30 minutes while the pressure of the atmosphere inside the vessel was kept at $10^{-1}$ Torr throughout.

Cooled and taken out of the vacuum vessel, the sintered body and the fusion-made body were found to be firmly bonded together at the contacting surfaces into an integrally jointed body. The jointed body was subjected to a tensile test and became destroyed at a tensile strength of 33 kg/mm$^2$. The breakage of the jointed body took place not at the interface of bonding but within the fusion-made body.

For comparison, the same rectangular blocks of the sintered body and the fusion-made body were bonded together by the method of diffusion bonding in a high vacuum of $10^{-4}$ Torr and the thus jointed body was subjected to the tensile test to find that breakage occurred within the sintered body at a tensile strength of 12 kg/mm$^2$.

The above results indicated not only that the bonding strength between the bodies exceeded the strength of the porous body per se but also that the strength of the porous body was greatly increased by the infiltration of the infiltrater material thereinto to give a tensile strength of not lower than 33 kg/mm$^2$ in comparison with the strength of the body of 12 kg/mm$^2$ without infiltration.

EXAMPLE 2

The experimental procedure was substantially the same as in Example 1 except that the sintered body was shaped with an atomized iron powder containing 1% of carbon powder and the fusion-made body was prepared with another carbon steel S55C specified in JIS G 4051. The tensile test with the thus jointed body gave a strength of 74 kg/mm$^2$, breakage taking place not at the interface of jointing but within the sintered body indicating a remarkable increase in the mechanical strengths thereof by the infiltration of the infiltrater material to approach the strength of the S55C material.

What is claimed is:

1. A method for bonding a porous body and a fusion-made body which comprises the steps of
    (a) bringing a surface of the porous body and a mating surface of the fusion-made body into contact with each other,
    (b) placing an infiltrater material having a lower melting point than the porous body and the fusion-made body at a side of the contacting surfaces between the porous body and the fusion-made body, and
    (c) heating the infiltrater material and the porous body and the fusion-made body in contact with each other, while maintaining a contacting pressure of at least 5 Kg/cm$^2$ at the contact surfaces, to a temperature exceeding the melting point of the infiltrater material but lower than the melting points of the porous body and the fusion-made body in an inert atmosphere.

2. The method as claimed in claim 1 wherein the inert atmosphere is vacuum of $10^{-1}$ Torr or a lower pressure.

3. A method according to claim 1 wherein said porous body is a preformed sintered body.

4. A method according to claim 3 wherein said sintered body is a sintered metal body.

5. A method according to claim 3 wherein said sintered body is a sintered ceramic body.

* * * * *